United States Patent
Wood

[19]

[11] Patent Number: 5,813,861
[45] Date of Patent: *Sep. 29, 1998

[54] TALKING PHONICS INTERACTIVE LEARNING DEVICE

[75] Inventor: Michael Carleton Wood, Berkeley, Calif.

[73] Assignee: Knowledge Kids Enterprises, Inc., Los Angeles, Calif.

[*] Notice: The term of this patent shall not extend beyond the expiration date of Pat. No. 5,511,980.

[21] Appl. No.: 880,141

[22] Filed: Jun. 20, 1997

Related U.S. Application Data

[63] Continuation-in-part of Ser. No. 200,609, Feb. 23, 1994, Pat. No. 5,511,980, and a continuation of Ser. No. 382,331, Feb. 1, 1995, abandoned.

[51] Int. Cl.⁶ .................................................. G09B 5/00
[52] U.S. Cl. ......................... 434/169; 434/167; 434/327; 434/185; 434/317
[58] Field of Search ..................................... 434/156, 157, 434/159, 167, 169, 178, 185, 307 R, 308, 201, 317, 322, 327, 334, 335, 337, 350, 362, 365; 341/34; 40/409, 411, 427; 273/236–239, 272; 381/51

[56] References Cited

U.S. PATENT DOCUMENTS

| | | |
|---|---|---|
| 3,146,534 | 9/1964 | Brown et al. . |
| 3,172,215 | 3/1965 | Ragen . |
| 3,201,875 | 8/1965 | Porteus et al. . |
| 3,252,230 | 5/1966 | Doney . |
| 3,391,476 | 7/1968 | Sher . |
| 3,477,140 | 11/1969 | Ryan et al. . |
| 3,508,349 | 4/1970 | Gilden et al. ............................ 434/335 |
| 3,637,221 | 1/1972 | Geils et al. . |
| 3,704,337 | 11/1972 | Sims, Jr. et al. . |
| 3,768,179 | 10/1973 | Woodford et al. ...................... 434/308 |
| 3,798,797 | 3/1974 | Mandel . |
| 3,805,416 | 4/1974 | Plefkey . |
| 4,280,809 | 7/1981 | Greenberg et al. ..................... 434/343 |
| 4,348,191 | 9/1982 | Lipsitz et al. . |
| 4,353,700 | 10/1982 | Volakakis . |
| 4,357,489 | 11/1982 | Henderson et al. . |
| 4,358,278 | 11/1982 | Goldfarb ................................. 434/337 |
| 4,403,965 | 9/1983 | Hawkins . |
| 4,403,966 | 9/1983 | Yang .................................. 434/169 X |
| 4,449,941 | 5/1984 | McGuire et al. . |
| 4,646,350 | 2/1987 | Batra . |
| 4,664,634 | 5/1987 | Cutler et al. . |
| 4,673,357 | 6/1987 | Ito . |
| 4,681,548 | 7/1987 | Lemelson ............................... 434/311 |
| 4,689,817 | 8/1987 | Kroon . |
| 4,703,573 | 11/1987 | Montgomery et al. . |
| 4,729,564 | 3/1988 | Kuna et al. . |
| 4,731,027 | 3/1988 | Phinney ............................. 434/169 X |
| 4,778,391 | 10/1988 | Weiner . |
| 4,854,879 | 8/1989 | Chang . |
| 4,869,701 | 9/1989 | Kawai et al. . |

(List continued on next page.)

FOREIGN PATENT DOCUMENTS

| | | | |
|---|---|---|---|
| 0 231 142 A2 | 8/1987 | European Pat. Off. .......... | A63H 5/00 |
| 2 597 243 | 10/1987 | France .............................. | G09B 17/00 |
| 2 110 455 | 6/1983 | United Kingdom ............. | G09B 7/02 |

OTHER PUBLICATIONS

The brochure of J.C. Penny Catalog, Christmas 1993, p. 486.

*Primary Examiner*—Joe Cheng
*Attorney, Agent, or Firm*—Coudert Brothers

[57] ABSTRACT

An interactive learning device in a laid open book format for toddlers and preschoolers, having a plurality of advantageous features. The device has keys in the form of raised letters of the alphabet that are depressed to make a voice processor circuit recite the letters. The learning device receives a card that spells out a word, and the speech processor circuit, upon the depressing of the keys that correspond to the letters constituting the word, pronounces the word phonetically, both letter by letter and by the entire word. The device provides numerous feedback mechanisms for reinforcing learning, and is of a portable, compact shape.

29 Claims, 5 Drawing Sheets

U.S. PATENT DOCUMENTS

| | | |
|---|---|---|
| 4,871,176 | 10/1989 | Knetzger . |
| 4,884,972 | 12/1989 | Gasper ............................ 434/169 X |
| 4,978,302 | 12/1990 | Clossey . |
| 4,980,919 | 12/1990 | Tsai . |
| 4,990,092 | 2/1991 | Cummings . |
| 4,997,374 | 3/1991 | Simone . |
| 5,120,065 | 6/1992 | Driscoll et al. . |
| 5,122,062 | 6/1992 | Cutler et al. . |
| 5,127,869 | 7/1992 | Hanzawa . |
| 5,163,844 | 11/1992 | Hollis, Jr. et al. ...................... 434/327 |
| 5,277,588 | 1/1994 | Lin . |
| 5,346,399 | 9/1994 | Sakow . |
| 5,356,296 | 10/1994 | Pierce et al. . |
| 5,364,272 | 11/1994 | Herman et al. . |
| 5,372,511 | 12/1994 | Cheung ............................ 434/327 X |
| 5,429,513 | 7/1995 | Diaz-Plaza . |
| 5,478,240 | 12/1995 | Cogliano ........................... 434/169 X |
| 5,556,283 | 9/1996 | Stendardo et al. . |

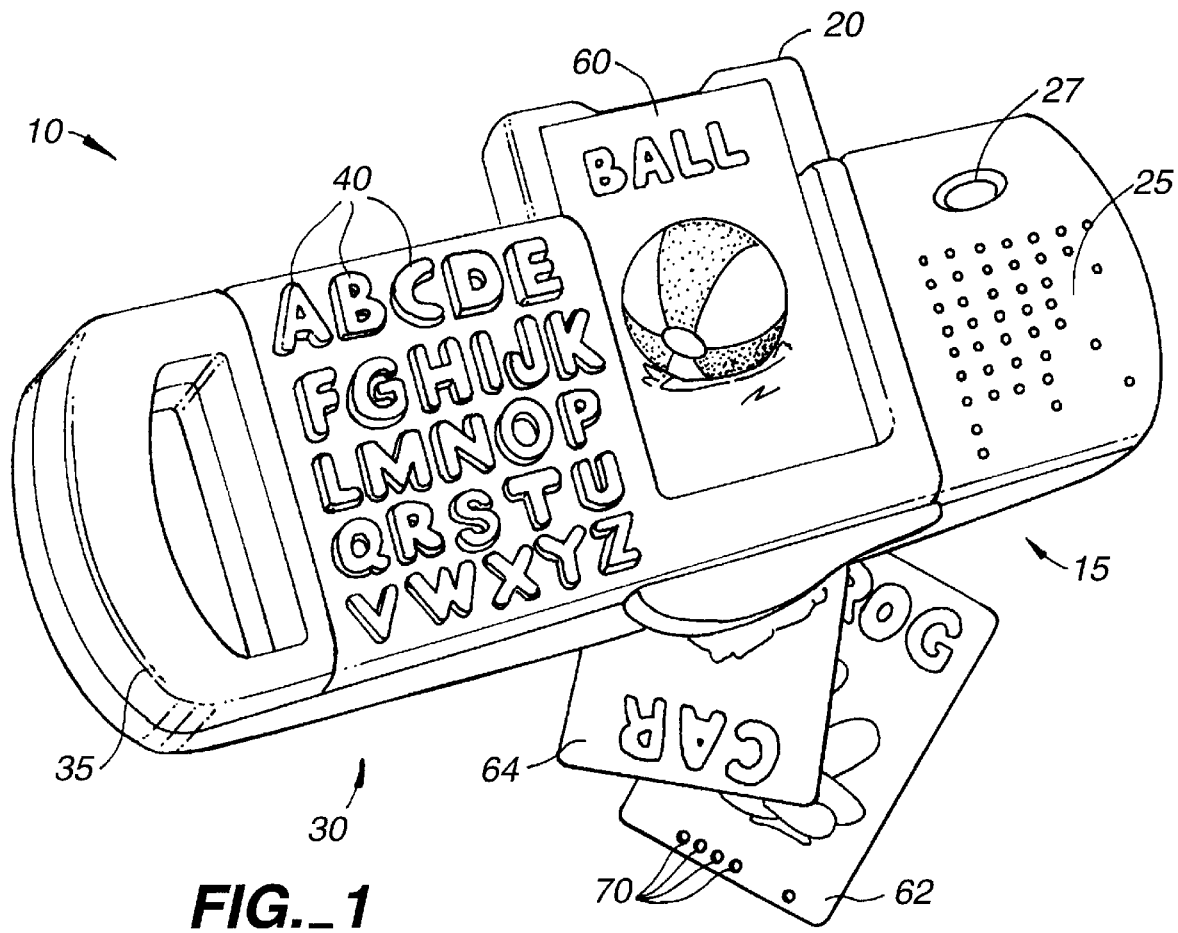
FIG._1
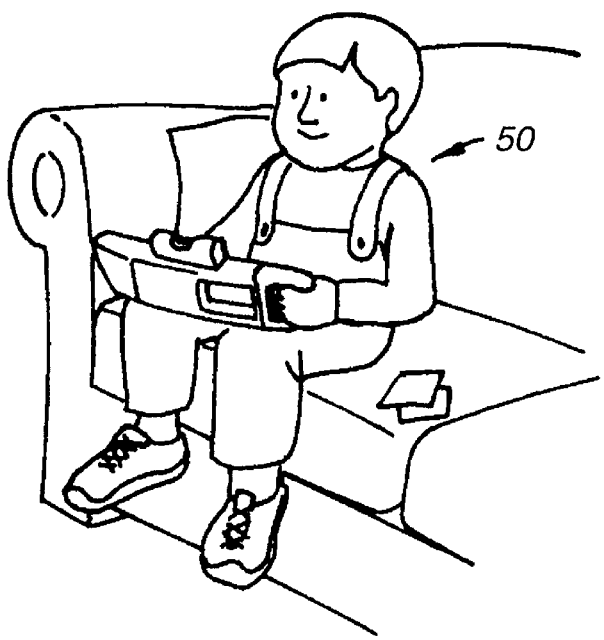
FIG._2

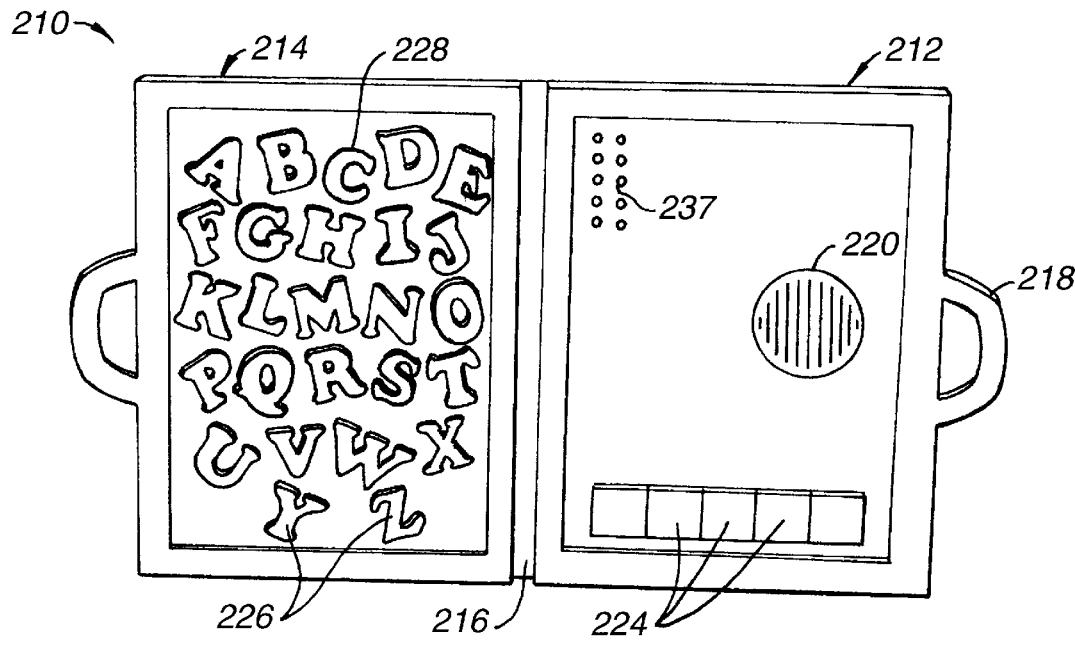
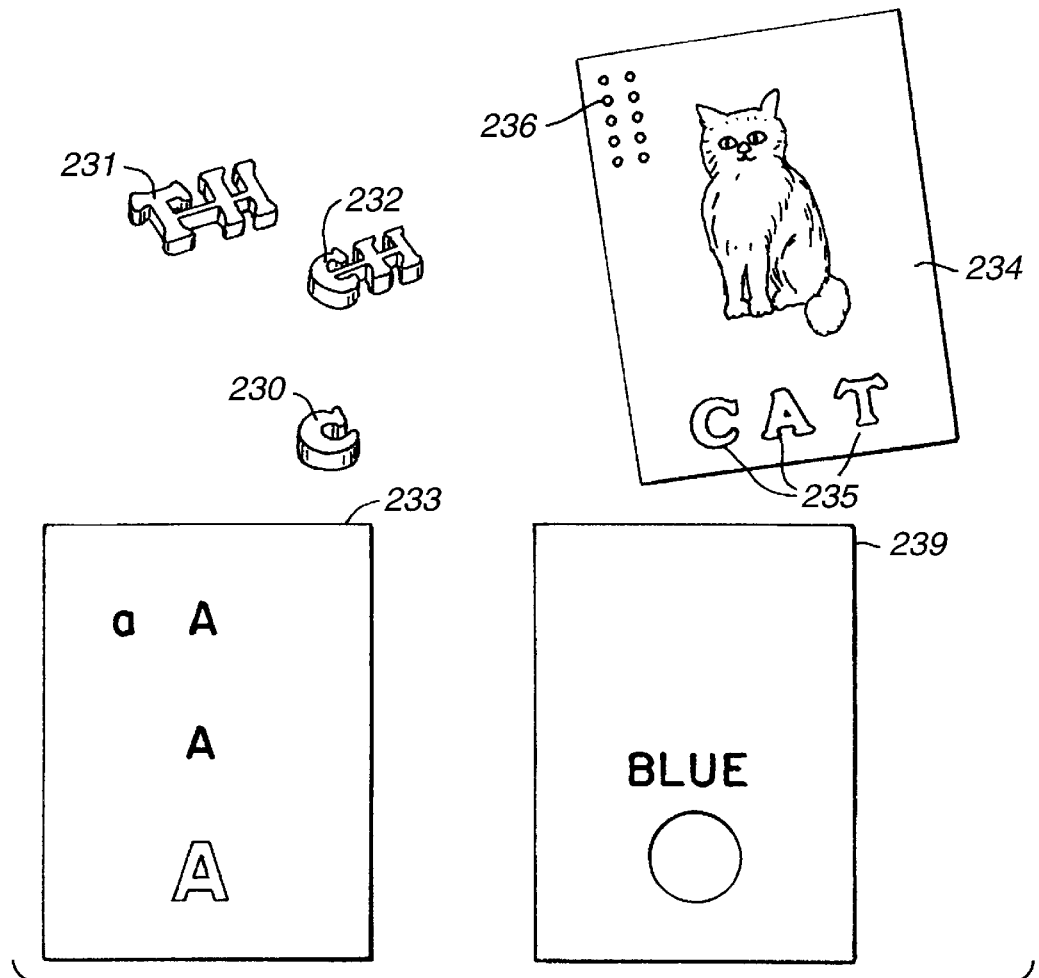
FIG._3

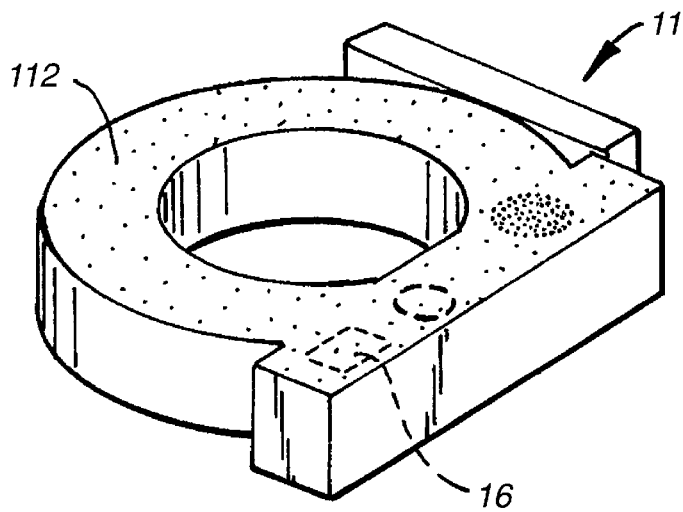
FIG._4
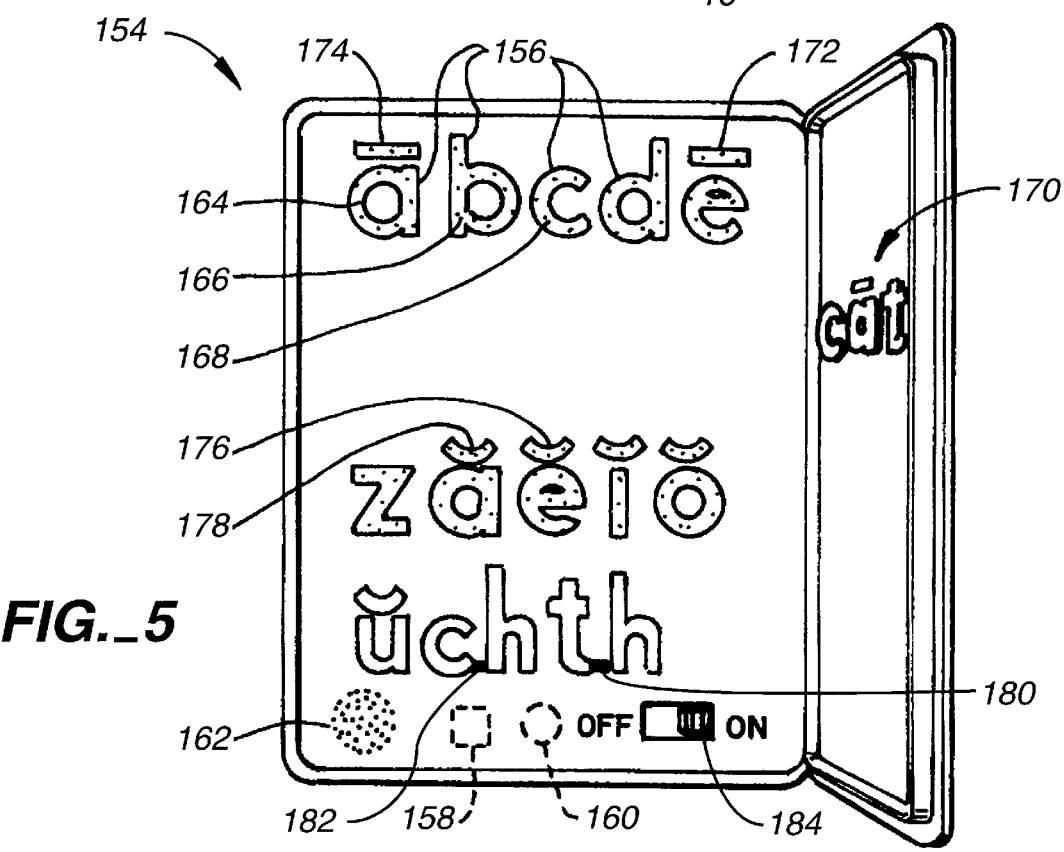
FIG._5
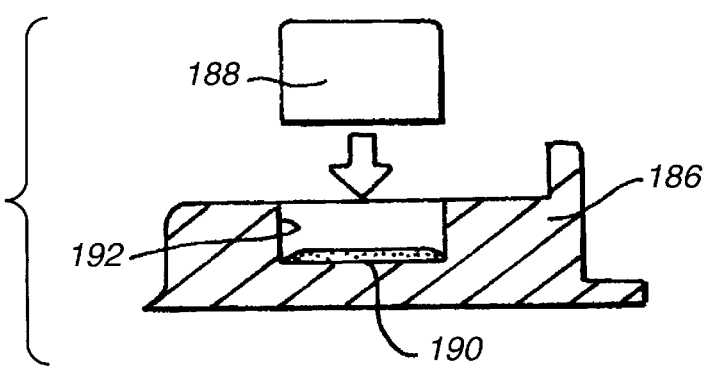
FIG._6

TALKING PHONICS INTERACTIVE LEARNING DEVICE

CROSS REFERENCES TO RELATED APPLICATIONS

This application is a continuation-in-part of U.S. patent application Ser. No. 8/200,609, filed Feb. 23, 1994, now U.S. Pat. No. 5,511,980, and a continuation of U.S. application Ser. No. 08/382,331, filed Feb. 1, 1995, now abandoned.

BACKGROUND OF THE INVENTION

Children learn letters, numbers and the names of various objects by audible repetition accompanied with visualization of the objects. Often, a parent or teacher will read a book aloud while pointing to the object depicted by the word which is read. In this way, the child is able to visually associate the object with its name. This method of teaching is generally passive, i.e., there may be little interaction between the child and subject matter. Interactive teaching methods using multiple sensory perceptions are more effective than mere memorization.

The present application is a continuation-in-part of U.S. patent application Ser. No. 08/200,609, filed Feb. 23, 1994, now U.S. Pat. No. 5,511,980, and incorporated by reference herein. The device described herein provides many advantages over prior art devices in such a way as to invite interaction with children and facilitate the learning process for speaking, reading and memorization.

SUMMARY OF THE INVENTION

The present invention generally relates to an interactive learning having electronic circuitry for generating an audible sound in response to touch contract with the device. More specifically, the device relates to an interactive learning device having one or more preferably touch sensitive three dimensional indicia bearing units, each representing a letter or number which, upon touching, activates voice synthesis circuitry to audibly produce the name and/or phonetic sounds associated with the indicia bearing unit. Thus, a user can establish a relationship between the symbols of letters or numbers represented by the indicia bearing unit to the sounds and names associated with those symbols. In addition, the device is fun to use by toddlers and preschoolers.

The present invention includes an indicia bearing housing having a speech processor (or voice synthesis circuitry) electrically coupled with an amplifier and speaker. The indicia bearing housing houses one or more three dimensional indicia bearing units, each operatively engaged to a switch, preferably a touch sensitive surface switch, underlying the indicia bearing units. The touch sensitive surface is electrically coupled to the voice synthesis circuitry to activate the synthesis processor upon user contact. Touching an indicia bearing unit produces an audible synthesized voice representing an assigned sound or phoneme. The phoneme, one of the smallest units of speech, represents the name or phonetic sound associated with the indicia bearing unit. For example, the letter "a" would have a phonetic assigned to the letter "a."

The present invention further provides for an "open book" format, housing a plurality of raised (three-dimensional) indicia bearing units (or more specifically, a letter or key) held by the left hand side of the device, and a card or template receiving portion on the right side of the device that receives a card or template. The indicia bearing units on the left hand side are fixedly secured to the housing and each overlie a touch sensitive switch, while on the right hand side there would lie the card, removably secured to the housing and held by the card receiving portion.

In one embodiment, called the "talking dictionary" or "talking words" embodiment, a plurality of cards, each card having a word and picture associated with the word, are placed over the card receiving portion of the device. The electronic circuitry in the device is able to recognize what particular card has been placed in the book, and recites aloud the word depicted therein.

In one embodiment of the present invention, the child then may depress a letter on the left hand side of the device that corresponds to and has a counterpart to a letter found in the card inserted into the card receiving portion on the right hand side of the device. Thereupon a speaker in the housing is activated to recite the phonic associated with the letter so depressed, the phonic recited in the context that the phonic is associated with the word it is in. Furthermore, if the child presses all letters forming the word in the correct sequence they form the word, the device recites the entire word again and offers a verbal or audible compliment or reward. In this way the child receives multiple feedback in learning the word: once from the picture on the card associated with the word, once from the word being recited aloud when the is card is placed in the book, once when the keys are depressed (reciting the phonics associated with the word), once when the correct sequence of keys is depressed, and finally once when a reward is offered.

Furthermore the present invention in one embodiment is in a compact form that may be easily held by a toddler or preschooler.

BRIEF DESCRIPTION OF THE DRAWINGS

FIG. 1 is a perspective view of one preferred embodiment of the present invention, the "traveler's companion" embodiment.

FIG. 2 shows the device of FIG. 1 as it would be held by a toddler or preschooler.

FIG. 3 is a perspective view of one embodiment of the present invention, the "dictionary" embodiment, showing the book in laid open form, with a card outside the book.

FIG. 4 is a perspective view of a sample indicia bearing unit of an embodiment of the invention configured as a three dimensional alphabetic letter.

FIG. 5 is a perspective view of an alternative embodiment of the invention where the indicia bearing unit is a folding book having a plurality of raised three-dimensional fixed indicia.

FIG. 6 is a side cross-sectional view of a portion of an alternative embodiment of the invention where the indicia bearing unit is configured as a book or card having cut-outs for receiving indicia members, the cut-outs having switches contained therein, the switches activated by pushing the indicia member into the cut-out.

DETAILED DESCRIPTION OF THE PREFERRED EMBODIMENTS

Figure 7:
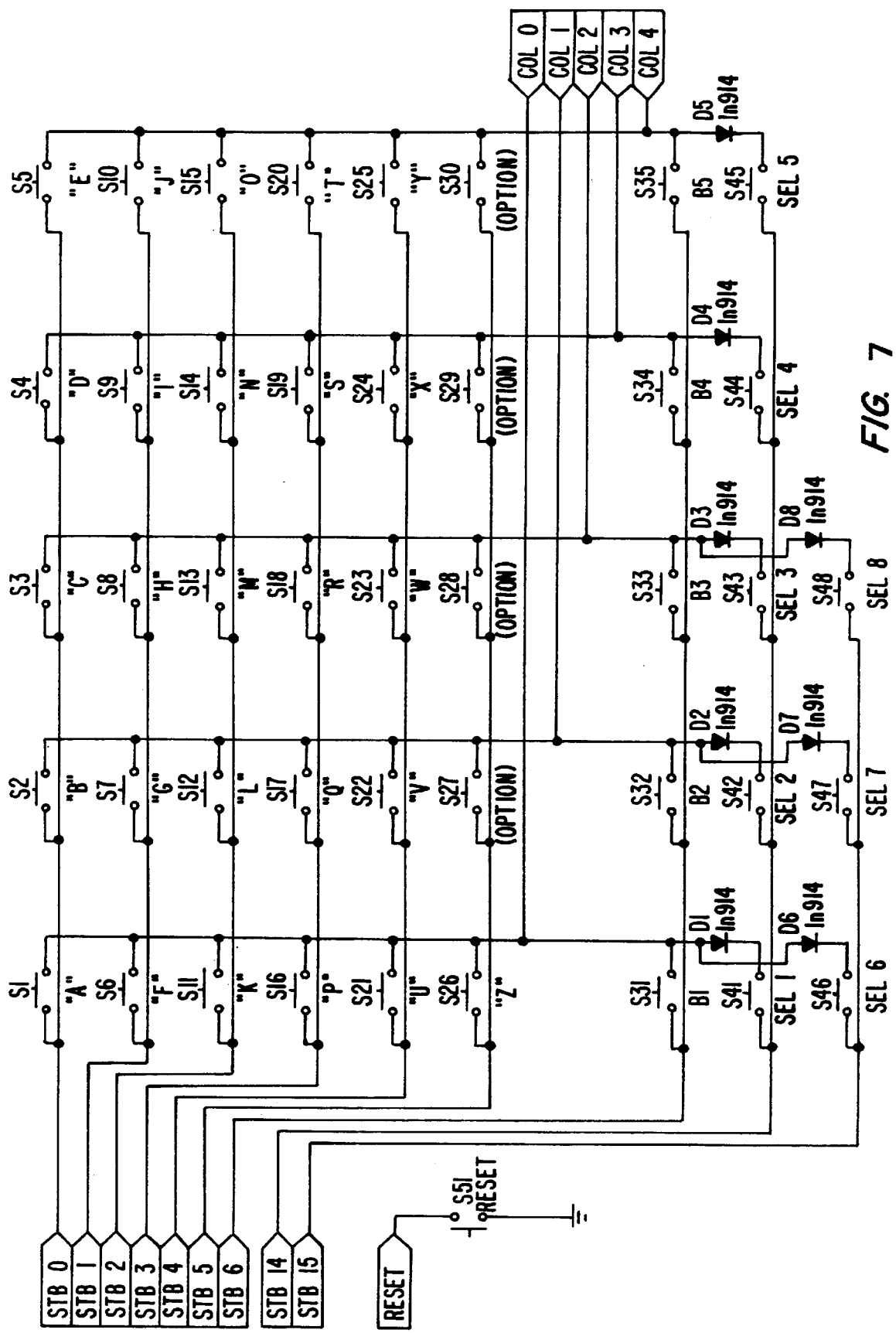
FIG. 7 depicts an implementation of the speech processor circuitry of the present invention.

Turning attention now to FIG. 1, there is shown a schematic view of a preferred embodiment of the present invention. There is shown the device 10, also termed a talking travel book or storybook, having a right hand portion 15, containing the card receiving means 20 and a speaker 25, and a left hand portion 30, containing a handle 35 and a plurality of keys 40 in the shape of letters. The keys are raised to give a three-dimensional look and feel. As can be seen the designation of 'right' and 'left' side is for descriptive purposes only, and the card receiving means 20 lies more generally in the center of the device 10. The book includes a battery door on the rear side for housing a power supply, and a readily accessible power supply switch 27. Audio jacks and volume control may also be provided along the sides of the housing (not shown). The plurality of three dimensional indicia bearing units 40 form keys, and are fixedly secured (not removable). The keys 40 are not removable in the preferred embodiment device 10 because the device is small enough to be held by a preschooler or toddler 50, as depicted in FIG. 2, and the keys would be too small to be safely detached (for fear of them being ingested). In the preferred embodiment device 10 measures approximately 38 cm. in length, end to end from the handle to the speaker, 15 cm in width, and 10 cm in depth.

Turning attention now to FIG. 3, there is shown a schematic view of another embodiment of the present invention. There is shown a talking book 210 having a right hand portion 212 and a left hand portion 214, with a living hinge 216 connecting the two sides. A pair of handles 218 provides a way of carrying the book when it is closed. The book includes a battery door on the front side for housing a power supply, a readily accessible power supply switch, and a speaker 220. A plurality of push-button keys or switches 224 (preferably no more than five) are found at the bottom of the right hand portion 212. The book may be made of a durable plastic material, in bright colors and with rounded corners for enhanced safety. A plurality of three dimensional indicia bearing units 226 are removably held in cutout indicia bearing unit seats or recesses on the left hand portion, such as recess 228 at the letter "C", which has been removed and shown at reference no. 230. The recesses may be formed in a manner as taught by U.S. Pat. No. 5,188,533, incorporated by reference herein. The same manner of holding the indicia bearing units may be employed in all embodiments of the invention. The indicia bearing units may be magnetically held as well. Each indicia bearing unit seat is shaped to conform with the outline of the specific symbol represented by the indicia bearing unit, and to secure the indicia bearing unit. In addition to letters A through Z, the left hand side of the book may hold digraphs such as "th", "ch", "ea", "ph", and so on. The digraphs are two letters held by a connecting portion therebetween, as shown. A card would have a corresponding cut-out recess to hold the digraph. Furthermore, the "silent e" may be represented by an indicia bearing unit that is made of clear plastic in the form of the letter "e".

Each indicia bearing unit is connected to or activates an underlying switch. The switch may be activated by any of the ways taught in U.S. Pat. No. 5,188,533, incorporated by reference herein. These switches may be used in all embodiments of the present invention. For instance, the indicia bearing unit may have a touch sensitive surface that uses radio frequency means to relay that it has been touched; the indicia bearing unit may overlie a touch sensitive switch, or the switch may be any kind of switch that uses contact with or proximity to the indicia bearing unit in order to become activated.

A plurality of cards may be employed with the talking book, such as cards 233, 234, and 239. Card 234 shows a picture of a cat with the cut-out letters for "cat" underneath the picture. Other cards may have representations of letters of the alphabet with an appropriate cut-out, such as card 233, or representations of colors, such as card 239, which may be colored and with a cutout to receive an indica bearing unit. In addition, a plurality of geometric shapes may be represented by indicia bearing units, such as a figure of a star, a triangle, a square or a circle. Indeed, the representations shown by the cards and the indica bearing units are not limited by what is shown in the accompanying drawings but can include any type of graphical representation, printed indicia or numerical representation, or any combination thereof.

Each card, such as card 234, may be uniquely identified by the processor. In one embodiment, each card has on its upper left corner a unique signature that identifies the card and its contents. The signature may be a plurality of pin holes 236 that are received by mating pins 237 in the card receiving portion of the book. The presence or absence of a pin hole can encode information about the identity of the card. For example, with eight pins and using one bit for each pin, up to $2^8=256$ different cards may be uniquely identified in this manner by the speech processor circuitry inside the book. Other means for identifying the card may be used, such as the use of magnetic encoding and readers.

Referring back to FIG. 1, in addition to letters A through Z, the left hand side of the talking travel book may hold digraphs such as "th", "ch", "ea", "ph", and so on. The digraphs (not shown) would be two letters held by a connecting portion therebetween, as shown for example in the embodiment depicted in FIG. 3. Furthermore, the "silent e" may be represented by an indicia bearing key that is made of clear plastic in the form of the letter "e".

Each indicia bearing key is connected to or activates an underlying switch that can be of many forms. Preferably, the switch is configured as touch sensitive surface 112 which provides a large surface area over indicia bearing unit 11 as shown in FIG. 4 and is well known in the art. With such an electrical contact switch device, touching anywhere along touch sensitive surface 112 activates chip 16. The switch may be activated by any of the ways taught in U.S. Pat. No. 5,188,533, incorporated by reference herein.

Referring now to FIG. 5, an alternative embodiment of the invention is shown. In this embodiment, indicia bearing unit 154 is configured as a book having a plurality of raised three-dimensional indicia 156 each representing a phoneme. Indicia bearing unit 154 contains one synthesizing chip 158, power supply 160 and amplifier and speaker assembly 162 similar to that previously described in other embodiments. In this embodiment, however, each raised indicia 156 is not removable and has an independent switch, preferably in the form of a touch sensitive surface 164, 166, 168, etc. Each touch sensitive surface 164, 166, 168 is electrically coupled to chip 158 to activate the relevant dedicated synthesis information applicable to the letter or number represented by the raised three-dimensional indicia 156. Chip 158 contains sufficient memory in this embodiment to store information on each symbol represented in indicia bearing unit and has discrete electrical connections to each touch sensitive surface 164, 166, 168 or suitable addressing scheme. Sequential touching of touch sensitive surfaces 164, 166, 168 (and others represented) allows the user to construct the linking sounds of words 170 such as "cat." Additionally, two representations of each vowel can be provided to allow comparison of sounds. For example, one indicia can include a macron 172, 174, indicating the long vowel sound. To indicate the short vowel sound, the other indicia may include no symbol or the short vowel symbol 176, 178. Silent letters and common non-phonetic letters, i.e., "th" (element 180) or "ch" (element 182) are also included. An on-off switch 184 is also preferably provided to avoid undesired drain on the battery or power source. Note that although not shown an on-off switch is preferred to be included in all embodiments.

FIG. 6 shows a feature of another alternative embodiment of the invention. In this embodiment, a holder 186 (in the form of a book, card or any substrate) is provided nearly identical to the embodiment just described in FIG. 5, but the touch sensitive surfaces 164, 166, 168 are replaced by passive removable three-dimensional indicia 188 used to depress an electrical switch 190 secured in the bottom of indicia seat recess 192. Each switch 190 activates chip 158 as previously described. Each indicia 188 is passive, that is, it contains no electronic circuitry. Depressing indicia 188 into the applicable indicia seat recess 192 depresses switch 190 to make an electrical connection and activate chip 158. As such, indicia 188 functions as an electrical contact means when used in conjunction with switch 190. Alternatively, indicia 188 may include a metal surface which, when pressed into recess 192, makes a closed circuit electrical contact to activate chip 158.

These switches may be used in all embodiments of the present invention. As described above, the indicia bearing key may overlie a touch sensitive switch, or the switch may be any kind of switch that uses contact with or proximity to the indicia bearing key in order to become activate.

A plurality of cards is employed with the talking travel book, such as cards 60, 62 and 64. Card 60 shows a picture of a ball, with the letters spelling out "BALL" overlying the picture. Other cards may have representations of letters of the alphabet, or representations of colors, which may be colored, or depict other words and phrases with pictures representing the words and phrases. As used herein, the term 'word' may include a single letter of the alphabet as well. In addition, a plurality of geometric shapes may be represented by indicia bearing keys, such as a figure of a star, a triangle, a square or a circle. Indeed, the representations shown by the cards and the indica bearing keys are not limited by what is shown in the accompanying drawings but can include any type of graphical representation, printed indicia or numerical representation, or any combination thereof.

Each card, such as card 60, may be uniquely identified by the speech processor. In preferred embodiment of FIG. 1, each card has on its lower edge a unique signature that identifies the card and its contents. The signature is a plurality of pin holes 70 that are received by mating pins (not shown) in the card receiving portion of the book. The presence or absence of a pin hole can encode information about the identity of the card. For example, with eight pins and using one bit for each pin, up to $2^8=256$ different cards may be uniquely identified in this manner by the speech processor circuitry inside the book. Other means for identifying the card may be used, such as the use of magnetic encoding and readers, electro-optical readers such as laser diodes or LED's and/or photo-transistors, bar code strips and readers, or any mechanical, electrical or electromechanical identifying means or any combination thereof.

The operation of the "talking travel book" of the present invention will now be explained as follows. The talking travel book is powered on. On the left-hand portion are a plurality of fixed indicia bearing keys 40, in the center or right of center portion is the card-receiving portion 20, on the far right is the speaker 25, and on the far left is a carrying handle 35.

A child takes out a card that has on it some combination of phonetics that may comprise a simple word. For purposes of illustration, suppose that word is "ball". Card 60 has on it a color picture of a ball, and at the top are the letters "b-a-l-l" as shown. The child slides card 60 into the card receiving portion 20 of the device, which is wide enough to accept the card, face up and upright. The card is slid downwards until the card has been properly inserted and seated, and a voice-synthesizer processor (not shown) will recognize the card by virtue of its identifying means such as represented by holes 70, and cause the speaker to recite the name associated with the card, here, the word "ball". Thereupon the processor will wait for the child to depress the indicia bearing keys on the left portion of the book that correspond to the letters in the word "ball", here the letters "b", "a" and "l".

Every time the child depresses a letter key, the book will recite the phoneme of the letter associated with that letter, in the context that the letter is used in the word or phrase depicted on the card, here "ball". Thus, for the example where the subject is "ball" as shown if the child depresses the correct letter key of "b" the processor will sound the phoneme "b" as "b" is pronounced in "ball". If the child depresses the correct letter key of "a", the processor will sound the phoneme "a" as "a" is pronounced in "ball". If the child depresses the letter "l" the processor will sound the phoneme "l" as "l" is pronounced in "ball". To further illustrate this point, if the word was "bat" the phoneme "a" in "bat" would be pronounced differently than the "a" in "ball."

In the event the letter depressed is not one of the targeted letters, such as in the "ball" example above the letters "b", "a" or "l", the processor recites the letter in the usual way an alphabet letter is recited, or, optionally, if the letter is not one of the correct letters, the processor may remain silent or issue an error message. Thus a child may learn the alphabet even in the absence of using cards.

If the child depresses the letter keys in the correct sequence, for instance in the "ball" example, first the letter "b" then the letter "a" and finally the letter "l" (twice), the processor would recite the entire word, in the phonemically proper manner, and then issue a "reward" for encouragement in the form of a word, phrase or tone.

In the preferred embodiment the processor used in the present invention stores all the phonemes associated with each stored word in a compressed Linear Predictive Coding (LPC) form. The processor may be a speech processor such as voice synthesizer chip TSP50C19, Texas Instruments Model No. TSP50C19, a LPC voice synthesizer as described in U.S. Pat. No. 5,511,980, which can store 32K in memory. With 32K in memory, roughly 150 words may be stored, in addition to their phonemes, which are separately stored from the words. Additional memory may be added to this chip, with suitable design modifications.

Figure 8:
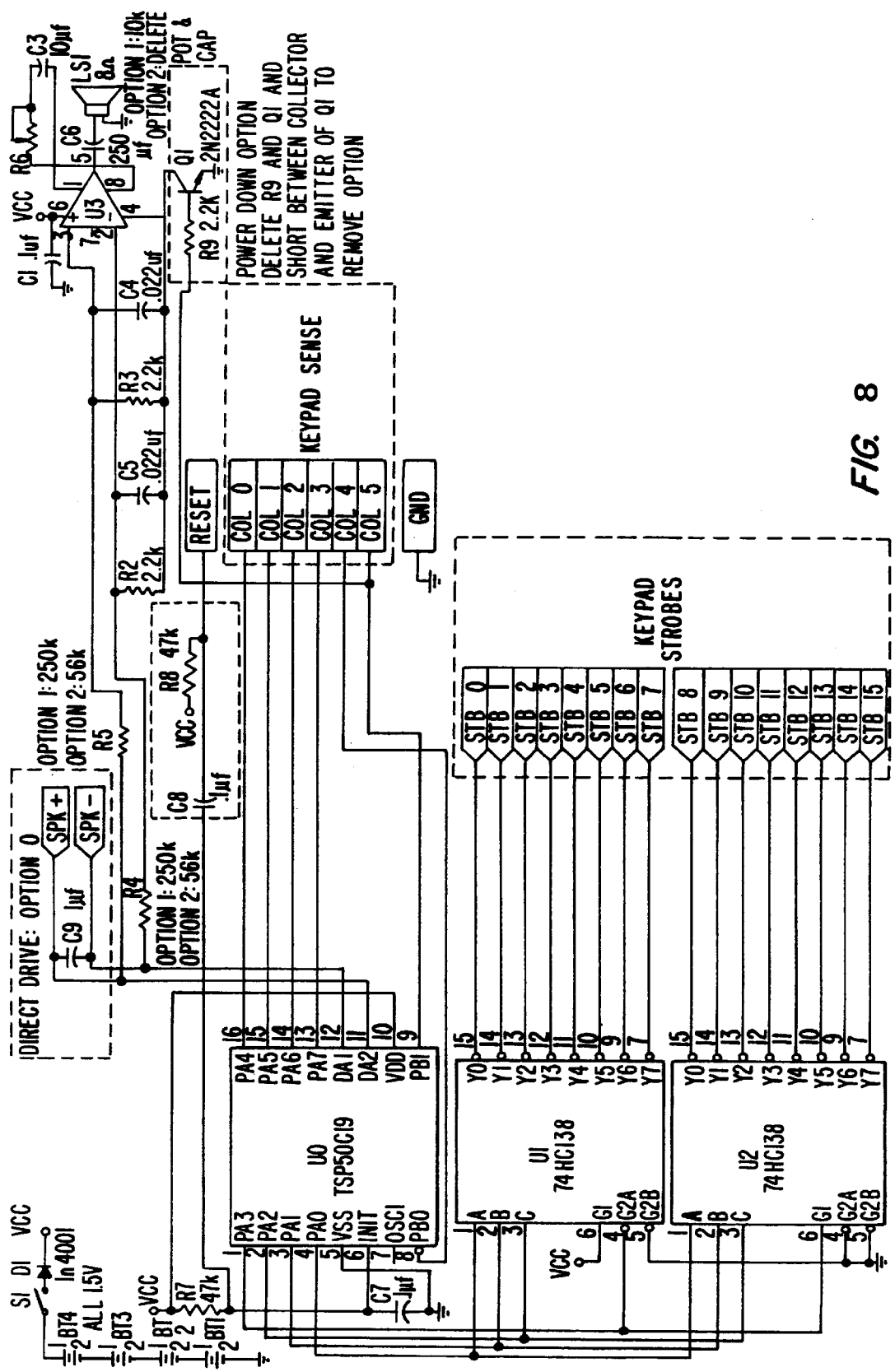
FIG. 8 depicts another implementation of the speech processor circuitry of the present invention.

Referring to FIGS. 7 and 8, the voice synthesizer chip TSP50C19 is connected to 8 ohm speakers through pins 11 and 12. Pins 1–4, 8, 9, and 13–16 lead to the pins that control the switches that lie under the five keys on the right hand portion of the book or the under the letters of the alphabet on the left hand portion.

The switches are arrayed on a standard matrix of pin leads, with five columns, represented by pins COL 0–COL 5, and a maximum of 16 rows, represented by pins STB 0–STB 15. In theory this arrangement will allow up to 96 key pad sensor switches to be supported. In one embodiment, a total of 26 letters of the English alphabet, and optionally such phonetics and digraphs as the "silent e", some short vowels and hard consonants have keys associated with them may be supported. In addition, some indicia bearing units representing some principal colors may be supported, on the left hand side of the book. By depressing any one of the keys, the phonic associated with the key will be recited.

Pins STB 14 and STB 15 go to the card identifying portion of the circuit, and receive input from the eight diode shunted switches that are connected to the card-reading pins or keys of the card receiving portion, that identifies the card, as explained more fully herein.

The values of the components making up FIGS. 7 and 8 are as shown in the drawings and can be summarized as follows, where k=kilo-olims, uf=micro-farads, V=volts, model numbers refer to component model numbers, and letters refer to components, with the prefix letters designating components as follows: D=diodes, BT=batteries, C=capacitors, S=switches; R=resistors, Vcc=power supply voltage, Q=transistors (npn), U=other component chips.

There are several optional configurations of the circuit, which can be generally described as follows. Regarding the speaker, Option 0 is defined when the speaker is driven directly by the speech processor; Option 1 is defined if there is a fixed gain amplified speaker driven by the speech processor; Option 3 is defined when there is a user-adjustable variable gain amplified speaker driven by the speech processor. The keypad options are as follows: (1) continuous reset (2) extended keypad options. The power management options includes a amplifier power down mode. A power down (sleep) option for the device is desirable, in order to conserve power. In the power down option resistor R9 and transistor Q1 are deleted (open circuit), while to maintain the power down option the collector and emitter portions of Q1 are shorted. The power down option is necessary to conserve battery life because while the speech synthesizer chip (TSP50C19) is programmable to power down, the speaker(s) and op amp will continue to consume power.

Referring to FIGS. 7 and 8, BT1–BT4=1.5 V; D1=1n4001; C1=0.1 uf; C3=10 uf; C4, C5=0.022 uf; C6=250 uf; C7=0.1 uf; C8=0.1 uf; C9=1.0 uf; R4, R5=250 k (Option 1) or 56 k (Option 2); R2, R3=2.2 k; R6=10 k (log taper potentiometer Option 1; delete potentiometer and cap Option 2); R7=47 k; R8=47 k; SPK+, SPK− connect to 8 Ohm speakers (optional); Op Amp LM386; U0=TSP50C19; U1, U2=74HC138; Q1=2N2222A. L51 (speaker, 8 Ohm).

For speaker Option 0; delete U3, C1, C3–C6, R2–R6, R9, Q1. Add C9, change LS1 from 8 to 30 ohm.

It should also be noted that the reset and continuous reset options are options to initialize the processor when a card is inserted onto the card receiving portion of the book, to start the program that the processor employs to have the word and/or phonic associated with the card spoken, and to voice the phonic associated with the keys, when the keys are depressed. In reset mode the reset is done by the manual activation of a switch every time the card is deployed onto the card receiving portion or template, while in the continuous reset mode the processor can be reset more readily mechanically, without the need of a separate switch. Thus with the continuous reset option delete C8 and R8 and short C8. In the reset option the pin labeled "reset" is an inverted logic pin.

It should be further noted that the speech processor chip of the present invention, TSP50C19, is software programmable. In general, however, any type of circuitry or chip may be employed.

Furthermore, the circuitry may be modified by a skilled artisan to incorporate the other features described and taught herein.

However, one skilled in the art may employ a variety of different processor chips, that may be general purpose processors used alone or in conjunction with voice synthesizers or specialized synthesizer chips, without detracting from the scope of the present invention, as disclosed and claimed herein, which covers a variety of embodiments irrespective of the particular circuitry used to implement the invention.

The present invention may further include other features known per se such as volume control switches, ON/OFF switches, power conserve (sleep) features and audio (headset) jacks. The traveling story book may also be waterproofed and made with a durable plastic material, in bright colors and with rounded corners for enhanced safety. The housing comprising the device may be of a unitary, one-piece plastic construction, with the speaker 25, handle 35, keys 40 and card receiving means 20 in series in the front of the device as shown by FIG. 1.

In addition to alphabet letters, the indicia bearing keys may represent colors, such as the primary colors, and the speech processor circuit may recite the colors in a similar manner to the recitation of letters. Other modifications and variations may be readily apparent to those skilled in the art, in view of the teachings disclosed herein.

The foregoing description is offered for illustrative purposes only. Numerous modifications and variations may be readily apparent to those skilled in the art, while still falling within the spirit and scope of the invention as claimed herein below.

What is claimed is:

1. A method of interactive learning comprising the steps of:

providing an interactive learning device having a plurality of letter-shaped keys, a card receiving portion, and a speech processor coupled to said keys, such that at least one phoneme is associated with each key;

providing a plurality of cards receivable by said card receiving portion and identifiable by the speech processor each card defining at least one predetermined sequence of letters representing a word;

placing at least one of said cards in said card receiving portion; and selecting said keys when said card is received by said interactive learning device, to cause said speech processor to compare said selected keys to said predetermined sequence, and if said selected keys are selected in correct order to spell the represented word, to recite a position-dependent phoneme associated with a selected key, or if said selected keys are not selected in the correct order, to recite a name of the letter of the key.

2. The method as recited in claim 1, wherein said speech processor recites said word when said keys are selected in the correct order to spell said word.

3. A teaching device, comprising:

(a) a sequential arrangement of selectable indicia representing a plurality of language symbols spelling a word, each language symbol having at least one phoneme associated therewith; and (b) an output, configured to compare a selected indicium to a predetermined sequence of indicia associated with the sequential arrangement and, if the selected indicium is selected in the sequence of the arrangement, to produce an output signal representative of a phoneme associated with the selected indicium, wherein the signal produced represents the phoneme associated with the language symbol as determined by a position of the selected indicium in the predetermined sequence or, if the selected indicium is not selected in the sequence of the arrangement, to produce an output signal representative of the name of the language symbol.

4. The device as recited in claim 3, wherein the output is responsive to a selection of an indicium from the arrangement.

5. The device as recited in claim 3, wherein at least some of the language symbols define letters.

6. The device as recited in claim 5, wherein successive selection of each indicium in the predetermined sequence causes the output to produce a succession of signals together representative of a pronunciation of the word.

7. The device as recited in claim 5, wherein an indicium in the predetermined sequence is associated with a silent "e" and selection of the indicium causes the output signal to be representative of no sound.

8. The device as recited in claim 7, wherein at least one language symbol represents a combination of at least two letters.

9. The device as recited in claim 8, wherein the at least one language symbol represents a digraph.

10. The device as recited in claim 3, wherein at least some of the indicia in the arrangement are fixed to the teaching device.

11. The device as recited in claim 3, wherein the output includes a voice synthesizer and a transducer, and the voice synthesizer is configured to generate an electrical signal representative of the phoneme and drive the transducer to produce the output signal.

12. The device as recited in claim 11, further comprising a switch configured to cause selection of at least one of the indicia.

13. The device as recited in claim 12, wherein the voice synthesizer includes a memory for storing output signals associated with a plurality of phonemes.

14. The device as recited in claim 13, wherein the voice synthesizer is configured to selectively access the memory in response to activation of the switch.

15. The device as recited in claim 14, wherein the output signal is an acoustic signal.

16. The device as recited in claim 3, wherein the output is configured to produce an output signal if the selected indicium is present in the sequential arrangement but not selected in the sequence of the arrangement.

17. The device as recited in claim 16, wherein the output signal is representative of a name of the selected indicium.

18. The device as recited in claim 16, wherein the output signal is representative of a phoneme and determined by the position of the selected indicium in the predetermined sequence.

19. The device as recited in claim 16, wherein the output signal is representative of an error message.

20. The device as recited in claim 3, wherein the output is configured to produce no output signal if the selected indicium is present in the sequential arrangement but not selected in the sequence of the arrangement.

21. The device as recited in claim 3, further comprising an input configured to change the predetermined sequence of indicia.

22. The device as recited in claim 21, further comprising a memory having stored therein a representation of a plurality of sequential arrangements of indicia.

23. The device as recited in claim 22, wherein the input receives a signal which references a stored one of the represented plurality of sequential arrangements.

24. The device as recited in claim 23, wherein the input comprises a card reader configured to receive cards each representing at least one sequential arrangement.

25. An interactive learning device, comprising:
a housing including a plurality of switches;
a sound production device in communication with the switches and including a processor and a memory;
at least one depiction of a sequence of letters, each letter being associable with a switch; and
a reader configured to communicate the identity of the depiction to the processor,
wherein selection of a depicted letter activates an associated switch to communicate with the processor, causing the sound production device to generate a signal corresponding to a sound associated with the selected letter, the sound being determined by a position of the letter in the sequence of letters.

26. The interactive learning device according to claim 25, wherein at least some of the letters are three-dimensional and mounted to said housing.

27. The interactive learning device according to claim 2, wherein said sound production device is configured to issue an audible acknowledgement when said letters are selected in said sequence.

28. The interactive learning device according to claim 25, wherein said sequence of letters defines a word, and said speech processor is configured to drive said speaker to recite said word when said letters are selected in correct order to spell said word.

29. The interactive learning device according to claim 25, wherein said sound production device produces no sound if said selected letter is not a correct letter in said sequence.

* * * * *